United States Patent [19]

Peck et al.

[11] Patent Number: 4,792,903
[45] Date of Patent: Dec. 20, 1988

[54] MICROPROCESSOR CONTROLLED POST EJECTION SEQUENCER

[75] Inventors: Walter R. Peck; James W. Duncan, both of Asheville, N.C.

[73] Assignee: Universal Propulsion Company, Inc., Phoenix, Ariz.

[21] Appl. No.: 757,802

[22] Filed: Jul. 22, 1985

[51] Int. Cl.[4] ............................................. B64D 25/10
[52] U.S. Cl. .............................. 364/425; 244/122 A; 244/122 AE
[58] Field of Search ............................... 364/425, 434; 244/122 AE, 122, 141, 138 R, 122 A

[56] References Cited

U.S. PATENT DOCUMENTS

| | | | |
|---|---|---|---|
| 3,530,868 | 9/1970 | Richards | 244/122 AE |
| 3,547,383 | 12/1970 | Carpenter | 244/150 |
| 3,669,388 | 6/1972 | Van Kreuningen | 244/138 R |
| 3,787,011 | 1/1974 | Phillips | 244/150 |
| 3,862,731 | 1/1975 | McIntyre | 244/141 |
| 4,057,206 | 11/1977 | Duncan et al. | 244/122 AE |
| 4,163,387 | 8/1979 | Schroeder | 364/443 X |
| 4,303,212 | 12/1981 | Stone et al. | 244/122 A |
| 4,395,001 | 7/1983 | Stone et al. | 244/122 AE |
| 4,448,374 | 5/1984 | Duncan | 244/122 AE |
| 4,505,444 | 3/1985 | Martin | 244/122 AE |
| 4,527,758 | 7/1985 | Ayoub et al. | 244/122 AE |
| 4,580,746 | 4/1986 | Peck | 244/122 AE |

Primary Examiner—Parshotam S. Lall
Assistant Examiner—Thomas G. Black
Attorney, Agent, or Firm—Roylance, Abrams, Berdo & Goodman

[57] ABSTRACT

A self contained, self powered microprocessor controlled aircraft ejection seat escape parachute deployment sequencer which can handle problems caused by high altitudes into the stratosphere and by high speeds above Mach 1, and which will deploy the parachute, based on seat mounted pitot tube and ambient pressure readings plus stored data, when speed and altitude are at human physiologically acceptable levels. Many failsafes to cope with unusual conditions, and additional features are also included.

22 Claims, 1 Drawing Sheet

MICROPROCESSOR CONTROLLED POST EJECTION SEQUENCER

FIELD OF THE INVENTION

The invention relates to aircraft ejection seats, and especially to control of the deployment of the parachute when the ejectee separates from the seat, and still more specifically to the use of a microprocessor to safely accomplish these functions from aircraft flying at high altitudes and at speeds greater than about Mach 1.

BACKGROUND OF THE INVENTION

The operational performance level of ejection seat escape systems has increased considerably over the past three decades. During this time period major strides have also been made in digital electronics, microprocessors and large-scale integrated circuits (LSIC). The invention applies this new technology to the control of ejection seat escape systems. Of particular interest here is the application of microprocessors to ejection seats in order that, among other things, the on-seat post ejection sequencing of recovery events could be more nearly optimized for the airspeed and altitude conditions existing at the time of the ejection.

Without the use of a microprocessor, post ejection sequencing of the recovery parachute is provided by the deployment sequencer covered by U.S. Pat. No. 4,448,374 to Duncan. One shortcoming of this prior art deployment sequencer is its inability to closely control the equivalent airspeed for parachute deployment as a function of altitude as the ejection altitude increases from sea level up to 15,000 feet above sea level. Since the maximum safe opening equivalent airspeed of a parachute decreases with increasing altitude, this deployment sequencer cannot allow full use of the parachute capability at all altitudes from sea level up to 15,000 feet.

During this same period covering the past three decades as the performance capability of ejection seat escape systems was improved, the performance envelope of the aircraft in which they were installed was also greatly extended in both airspeed and altitude so that the flying of missions at supersonic speeds at altitudes of 50,000 feet and higher is now common.

In an ejection at such supersonic airspeeds a normal shock wave will form a few inches forward of the ejectee and the seat which will preclude any on-seat measurement of the actual free stream airspeed and static pressure as long as this shock wave exists. The changes in Mach number and static pressure of the airstream as it passes through a normal shock wave are well known and as a function of the free stream static or ambient pressure, p1, and the free stream Mach number M1, the downstream static or ambient pressure, p2, and the downstream Mach number, M2, are given by the following expressions:

$$M2 = \sqrt{\frac{5 + M1^2}{7M1^2 - 1}}$$

For an aircraft flying at Mach two at the time of ejection, the static pressure immediately downstream of the normal shock wave is 4.5 times the freestream static pressure and the downstream Mach number is 0.289 times the freestream Mach number. For example, an aircraft flying at 38,000 fet MSL (3.00 psi static pressure) with a Mach number equal 2.0 (597.5 KEAS) which is within the state-of-the-art ejection seat theoretical escape capability, immediately downstream of the normal shock wave the static pressure is 13.5 psi (equivalent to 2400 feet MSL) and the Mach number is 0.577 (equivalent to 172.5 KEAS). Such low airspeed and altitude values, if sensed by an on-seat sequencing system, would cause immediate recovery parachute deployment with catastrophic results; i.e., the parachute would be destroyed and the ejectee killed.

Any post ejection sequencer dependent upon seat mounted sensors for measuring free stream total pressure and free stream static pressure can be provided erroneous pressure values as a result of: (1) pitot tube blockage by canopy fragment debris or other debris, (2) failed or erroneous reading pressure transducer, (3) excessive seat angular displacement from the face forward attitude, and (4) normal shock waves which occur in supersonic ejections. Therefore, it is important that erroneous pressure readings be recognized and discarded or corrected for through appropriate means in such post ejection sequencers that are dependent upon seat mounted sensors.

The dynamic pressure acting on a body moving through the air is proportional to the square of the true airspeed times the prevailing air density. The air density in turn is proportional to the prevailing static pressure divided by the prevailing air temperature (absolute). Both the static pressure and air temperature decrease with increasing altitude in the troposphere that extends up to an altitude of about 36,000 feet above MSL on a standard day. Above this altitude in the stratosphere the temperature remains constant but the static pressure continues to decrease with increasing altitude. The deceleration of an ejection seat in a horizontal trajectory, subsequent to ejection from an aircraft and after sustainer rocket burnout, is proportional to the dynamic pressure acting on it divided by its total mass. Therefore, the time to decelerate from a very high airspeed at ejection to an airspeed safe for recovery parachute deployment is a function not only of static pressure and dynamic pressure at the point of ejection but also of the prevailing air density, the effective drag area of the ejected seat, and the total mass of the seat and ejectee. In a dive trajectory a longer time for deceleration will be required as a result of earth gravity acting to accelerate the body and, conversely, in a climbing trajectory at ejection from the aircraft a shorter time will be required. Therefore an optimized post ejection sequencer will provide the shortest appropriate time to parachute deployment for all ejectee weights, for all altitudes at which it is safe to deploy the parachute, for hot or cold temperatures, for all aircraft dive, climb or whatever conditions at the time of ejection of the seat with the ejectee therein, and for all supersonic, transonic, or subsonic ejection airspeeds independent of the aircraft from which the ejection takes place or the local airflow conditions over the cockpit during the escape sequence.

Since the well being of the ejectee depends upon the successful operation of the recovery parachute at or below the maximum safe deployment airspeed of the parachute for the prevailing density of the surrounding air mass, and at or below the maximum altitude safe for the ejectee physiologically, it is essential that the parachute not be prematurely deployed under any possible failure condition and that it shall always be deployed upon reaching the maximum safe deployment airspeed and altitude or at some time shortly thereafter even under multiple failure conditions.

In an ejection at an extreme high altitude of 70,000 feet above MSL the time required to descend to the maximum altitude at which parachute deployment is desired will be from 140 to over 200 seconds. Conservation of the battery supply may be required during this time for descent in order that the microprocessor can successfully deploy the parachute when the desired altitude is reached.

Advantages of the Invention

This invention provides a microprocessor controlled post ejection sequencer which will generate an optimum time delay of the recovery parachute of an ejection seat for all ejection conditions within the envelope of the escape system.

Further, the invention provides failsafe operation in appropriate backup modes for certain multiple failures that could occur in the sequencer and provides immunity from any single failure than can occur in the system. The invention also provides means for conserving battery power during the time required to descend to low altitudes in ejections which have taken place at extreme high altitudes. Yet further, the invention provides maximum immunity of the post ejection sequencing from any external electromagnetic environment.

BRIEF DESCRIPTION OF THE INVENTION

During low subsonic ejections the ambient pressure measurement on the seat will be a direct function of the free stream static or ambient pressure. Since the free stream static or ambient pressure is a direct function of the altitude above sea level for any airspeed condition below about Mach 0.9, the seat ambient static pressure measurement can be used for computing the prevailing altitude and airspeed from which a proportional time delay for parachute deployment can be computed. However, at airspeeds above Mach 1.0, the seat ambient pressure measurement diverges more and more from the actual free stream static pressure as the Mach number increases. This is true because shock waves form on or in front of the seat/ejectee at transonic and supersonic airspeeds. In the transonic and supersonic cases, the invention microprocessor software will evaluate the environmental data inputs, as described below, and will delay post ejection sequencing and/or use of the input data until the airspeed has decayed to the subsonic condition.

The invention includes a microprocessor controlled sequencing apparatus for accomplishing the earliest optimum recovery parachute deployment following ejection of a manned ejection seat from an aircraft comprising the combination of a parachute and fully redundant means carried by the seat for deploying the parachute.

The invention post ejection sequencing system is completely contained within the seat assembly and does not require aircraft connections for electrical power nor for acquiring environmental data. The invention includes dual microprocessor controlled sequencers (MCS), each incorporating a microprocessor for computing; a thermal battery for power and an electrically fired initiator (EFI) to initiate the recovery sequence.

Each MCS incorporates two total pressure sensing transducers which receive inputs from the seat mounted pitot tubes and an ambient pressure sensing transducer to obtain the altitude input. The microprocessors use these data inputs and other parameters, such as parachute capability, which have been previously stored in appropriate memory to calculate a delay time required for recovery sequency initiation. The system design also provides as a back-up the capability to continuously sample the environmental conditions and to prevent parachute deployment until the conditions are appropriate.

More specifically, the invention apparatus includes left and right pitot tubes and left and right sequencer housings which are carried by the seat. Each housing contains first, second and third pressure sensors; a pressure operated switch; a battery; a multiplexer and an analog to digital converter that can selectively digitize the pressure value sensed by said three pressure sensors; a random access memory (RAM) wherein said digitized pressure values can be stored and subsequently compared; a read only memory (ROM) in each of the said housings wherein the preset data is stored, a central processing unit (CPU) with appropriate registers, accumulator, data bus and clock; an EFI with control circuitry; first conduit means for coupling the seat ambient air pressure to both of said first pressure sensors; second and third conduit means for coupling total pressures from said left and right pitot tubes to both of said second and third pressure sensors; and programs permanently set into both of said ROMs. The preset programming will:

(1) Self check the digital electronics, (2) Perform a comparison check of the three pressure sensors, (3) Set post ejection sequencing time to zero at the instant of pressure switch operation, (4) Override pressure switch operation if it has not occurred within a preset time period, (5) Continuously compare the first pressure sensor value to its previous mininum value and save the smaller value until a preset time delay has elapsed, (6) Continuously compare the second and third pressure sensor values to each other and select the larger value, (7) Continuously compare the selected larger value to the previous maximum value and save the larger value, and (8) Recognize when the post ejection sequencing time has reached a preset value. At that time, the invention will: (a) determine if the seat ambient air pressure as measured by the first pressure sensor is less than a first preset pressure value and if so will place the microprocessor in a quiescent state or low current drain condition for a preset period of time, but if not will determine if the ambient air pressure as measured by the first pressure sensor is less than a second preset pressure value (which must be greater than first preset pressure value) and if so continue to sense ambient air pressure until it is equal to or greater than the second preset value but if not then; (b) determine whether the ambient air pressure currently being measured by first pressure sensor is less than the minimum previous ambient pressure measurement so that a decreasing ambient pressure is indicated, if so save the current ambient air pressure value sensed by the first pressure sensor and continue saving the minimum measurement of the ambient air pressure until the current value is equal to or greater than the minimum previous ambient air pressure value saved and if not, then; (c) set a fixed time delay for parachute operation determined by both the ambient air pressure value measured by the first pressure sensor and by the maximum total pressure measured previously by either of the second and third pressure sensors, (d) determine if the larger total pressure value currently being measured by either of the second and third pressure sensors is larger than a predetermined total pressure value for the minimum ambient air pressure measured previously by the first pressure sensor, and if so continue to sense the two total pressure measurements, and if not, (e) generate an electrical output pulse to fire the EFI immediately if the time delay for parachute operation has elapsed and if not wait until the time delay for parachute operation has elapsed and then fire the EFI immediately.

(9) recognize when the time in the quiescent state or low current drain condition has reached the preset period of time and then go back into the full operational state to: (a) compare the ambient air pressure currently being measured by said first pressure sensor to both total pressure values currently being measured by said second and third pressure sensors with a third preset pressure value subtracted from both these said total pressure values, and (b) using two out of three voting determine that the two closest values are within a preset error limited and if not return to the quiescent state or low current drain condition or the preset period of time, and if so, (c) take an average of the said two closest values for the current ambient pressure and, (d) determine if the averaged value is less than the first preset pressure value and if so return to the quiescent state or low current drain condition for the said preset period of time, but if not, (e) determine if the averaged pressure value is less than the second preset pressure value and if so continue the two out of three voting and said pressure value averaging and the determining if the averaged pressure value is less than the second preset pressure value, but if not then, (f) generate an electrical output pulse to fire the EFI immediately.

BRIEF DESCRIPTION OF THE DRAWINGS

In order that the manner in which the foregoing and other objects are attained in accordance with the invention can be understood in detail, a particularly advantageous embodiment thereof will be described with reference to the accompanying drawings forming a part of this disclosure wherein:

FIG. 1 shows a typical crew station including an ejectable seat of a type with which the invention can advantageously be used. The apparatus, which is schematically illustrated to establish the environment and general type of equipment with which the invention is usable, includes an ejection seat indicated generally at 10 which carries with it a parachute in a parachute housing 11 and a drogue chute in a drogue housing 12. At the upper end of the seat is a canopy penetrating device 13 and the seat also carries apparatus 14 for propelling the seat out of the cockpit, the seat being provided with runners which can ride along rails 16 forming part of the aircraft which remain therein after ejection. Mounted to the left and right hand sides of the parachute housing 11, near its front surface, are a pair of pitot tubes 41 for measuring airstream total pressure. Only the left side pitot tube 41 appears in FIG. 1.

The ejection mechanism itself, including the specific drogue and recovery parachutes, their housings and the automatic apparatus for removing these housings at an appropriate time, are not part of the present invention and will not be further described. Various forms of these devices are known in the art and all can be employed in the invention.

Figure 1:
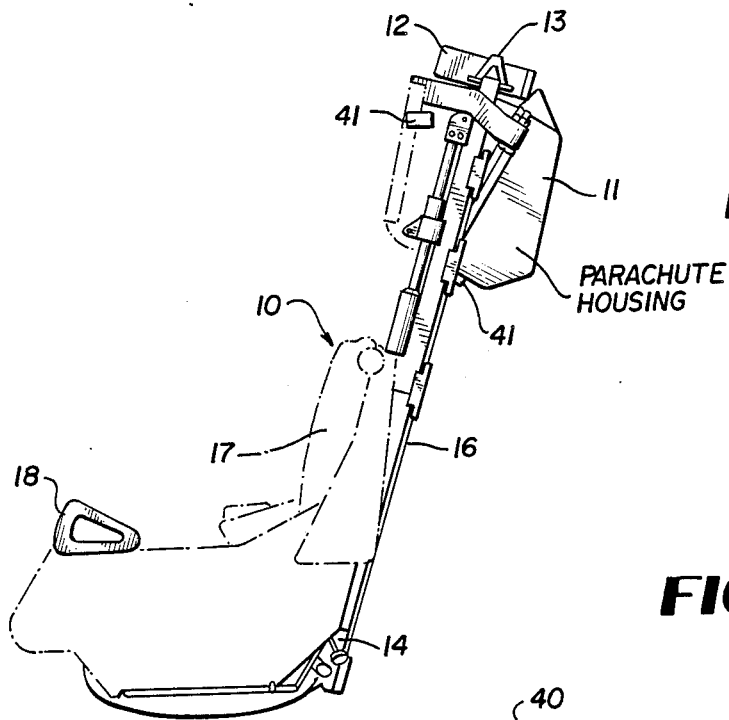
FIG. 1 is a simplified side elevation view of an aircraft seat usable with the present invention.

The present invention provides two substantially identical metal housings which can be located in the region 17 between the back support and the seat bucket structure. Also of interest in FIG. 1 is the provision of a manually operable handle 18 by which the ejection mechanism can be actuated.

Figure 2:
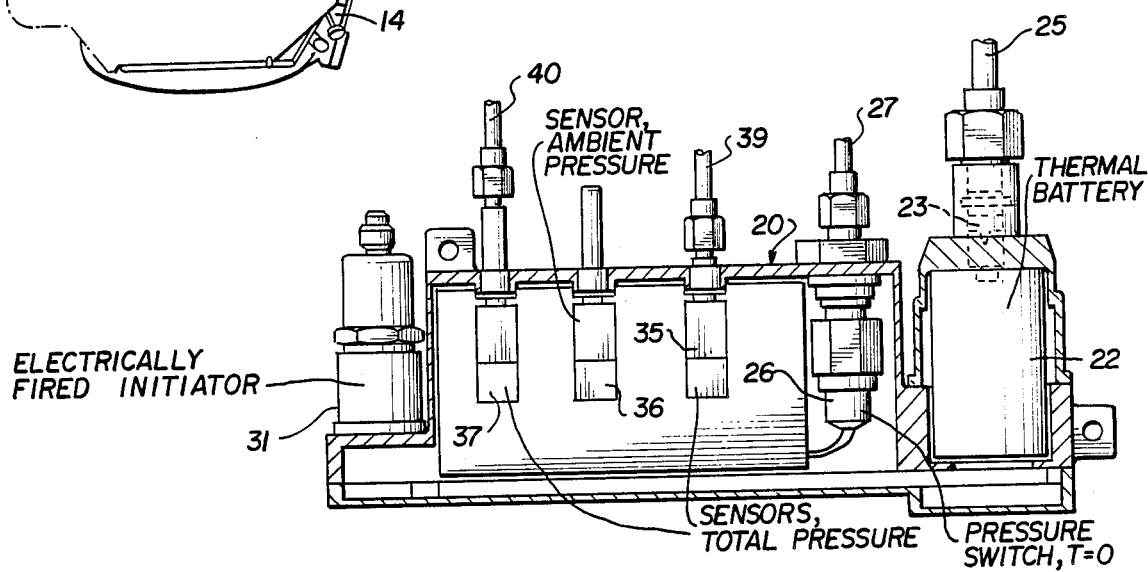
FIG. 2 is a side elevational view, partially broken away, of a sequencer in accordance with the present invention.
Figure 3:
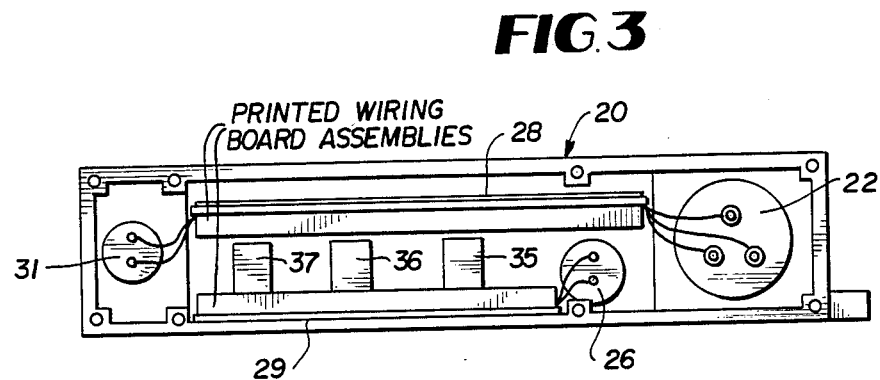
FIG. 3 is a top plan view of the device of FIG. 2.

One of the two housings 20 is illustrated in FIG. 2. Each of the two housings is a metal container which is substantially continuous except for openings to permit the passage of various conduits. Thus, each housing forms a very effective shield against electromagnetic interference signals and/or pulses such as might be created by ambient radar signals, nuclear explosions or lightning, preventing such signals from affecting the electronic devices within the housings. Both housings contain identical equipment, so only the devices in housing 20 are described and it will be understood that those in the other housing have the same structure and function. Each MCS assembly, shown in FIGS. 2 and 3, comprises a single cast chassis housing appropriate printed wiring boards (PWB), a thermal battery and an electrically fired initiator (EFI).

As shown in FIG. 2, the housing 20 includes a thermal battery 22 which is of a type that is capable of providing a minimum of 6 amperes to a 1 ohm resistance load for 10 milliseconds or longer at any time during its active life of over 200 seconds. A thermal battery of this type provides no output until its operation is intentionally commenced, whereupon after a delay of about 0.025 seconds, the output voltage is provided for an interval of over 200 seconds.

Activation of the battery is commenced by firing a pistol or percussion primer, 23, which firing is accomplished by gas pressure provided in a conduit 25 from a pressure source. This pressure source is activated when the firing handle 18 is pulled. Thus, upon ejection of the seat, gas pressure supplied through conduit 25 starts the battery in operation.

Upon ejection, as the seat moves out of the cockpit and reaches a point a few inches from the end of the catapult'stroke, a pressure tap in the catapult is opened and gas pressure from the catapult is supplied through conduit 27 to the time zero pressure switch 26 in housing 20. Housing 20 also includes the ambient pressure sensor 36 and two total pressure sensors, 35 and 37, which are coupled to conduits 39 and 40, respectively, which in turn are connected to the pitot tubes 41 mounted on the left and right hand sides of the parachute container 11 near its front surface. Thus, pressure sensors, 35 and 37 are actuated by the total free stream pressure head sensed by the left and right hand pitot tubes.

In the preferred system configuration, the pitot assemblies each consist of a Kiel type pitot tube supported within a cast structure and are mounted on the left and right hand side of the parachute housing or headrest. Kiel type pitot tubes are used because they are a very accurate means of picking up the total pressure even when misaligned with the airstream by as much as 60 degrees. Therefore, to take full advantage of their accurate sensing azimuth range, and to provide validity to the approach of continuous airspeed sampling, even in the unlikely presence of high seat yaw angles, the pitots are angled 30 degrees outboard. This installation assures accurate sample data even if the seat should yaw to an angle of 90 degrees. This produces an extremely safe and conservative design as, even if both the stabilizing fins should fail to deploy, the drogue has been proven to control yaw to within 45 degrees. The capability of the preferred pitot design has been historically proven by extensive wind tunnel and flight testing.

Pressure sensor 36 is open to ambient pressure in the volume between the back support and the seat bucket structure, and thus responds to a pressure that is representative of altitude.

To meet the invention's requirements, all three pressure sensors will be solid state absolute pressure transducers which have achieved considerable maturity in aviation applications and are of such size that they can be mounted inside the MCS housing.

The housing 20 also includes a multiplexer, and an analog-to-digital converter which are used to sequentially convert the three pressure sensor outputs into digital form for subsequent use by the microprocessor. Numerous existing microprocessor hardware configurations are suitable for use in the present invention and thus will not be further described. All electronic devices are mounted on printed wiring board assemblies, 28 and 29. The electrically fired initiator (EFI) 31, that is to be fired to produce the gas pressure energy required for parachute deployment, is also located in the housing 20. Thus, in the preferred embodiment of this invention all electronic devices, the electrical energy source, all electrical connections and connectors and the EFI are located inside the metal housing which provides the maximum possible protection against external electromagnetic energy sources of any kind, see FIG. 4.

Figure 4:
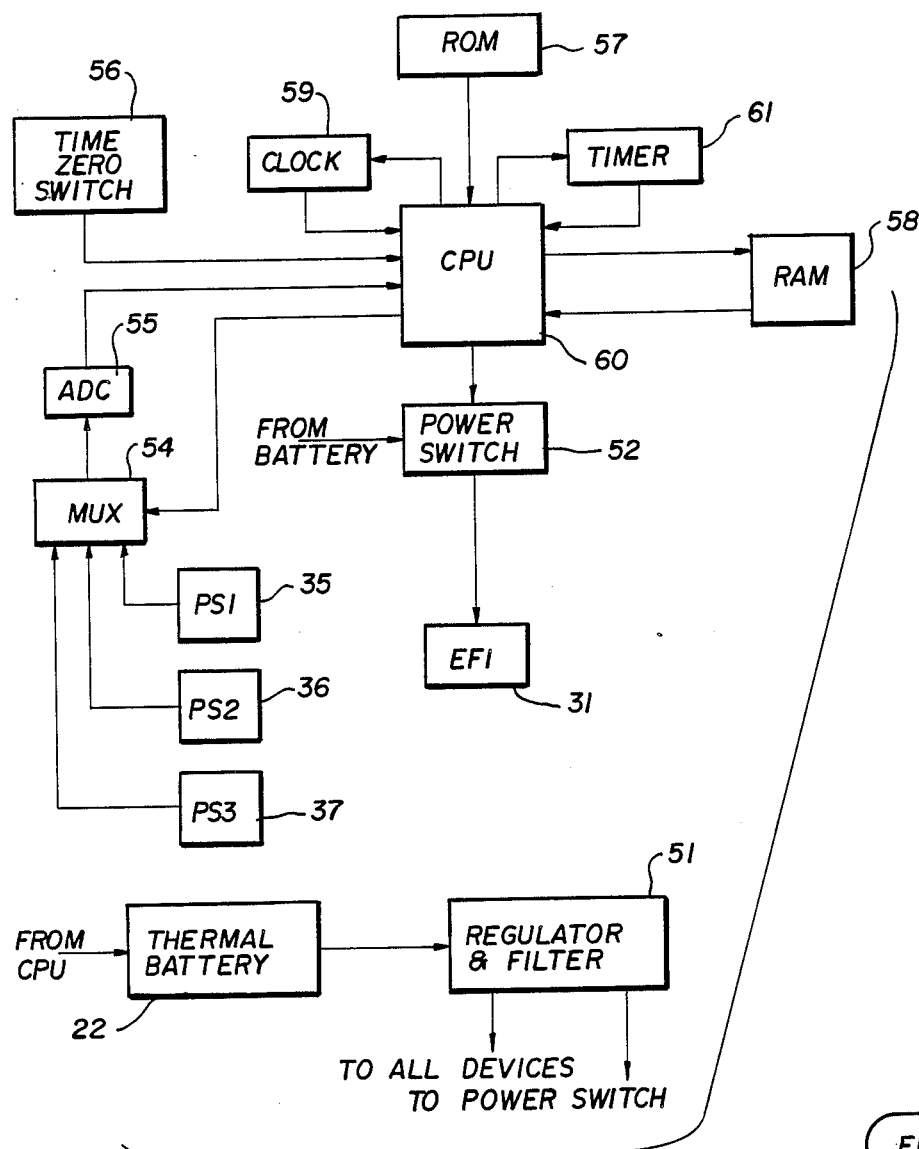
FIG. 4 is an electrical schematic diagram of a circuit embodying the invention.

Referring now to FIG. 4, one embodiment of the invention is shown in block diagram form. The central processing unit (CPU), 60, is under control of the read only memory (ROM), 57, which has had all preset control functions and system performance tables previously stored in it. The CPU 60, controls the multiplexer (MUX) 54, to sequentially apply the outputs of the three pressure transducers 35, 36 and 37 analog to digital converter (ADC) 55, for creating digital pressure data for use by the CPU. The CPU accepts inputs from the time zero switch 56, from the clock 59, and the timer 61. The CPU 60, using the data inputs will store the appropriate values in the random access memory (RAM) 58, for use in accessing the data stored in ROM 57. When the CPU determines that all conditions are correct for parachute operation it will cause the power switch 52 to close and the output from the thermal battery 22 via regulator and filter 51 will be applied to the electrically fired initiator (EFI) 31, as well as to all other devides controlled thereby.

Figure 5:
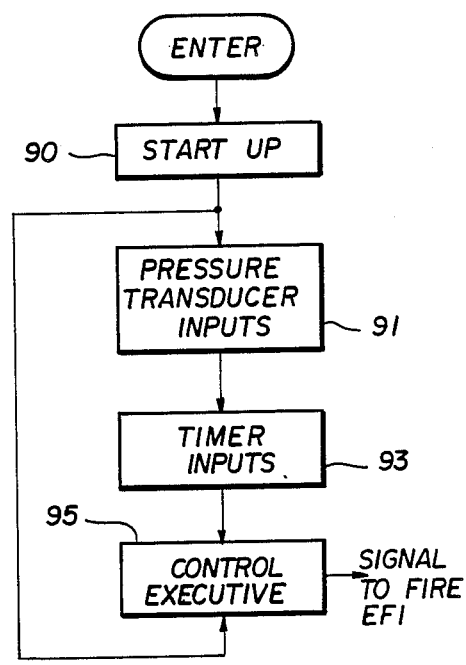
FIG. 5 is simplified modular type of drawing of the invention control structure.

Referring to FIG. 5, the invention controls the order in which the following system functions are performed, as follows:

Start Up—Box 90

Opens firing circuit to preclude inadvertent firing of EFI and controls and initializes all software parameters and database elements for system use as well as initializing system hardware interfaces such as; RAM store constant, database printers, system variable and timer parameters and checks circuits and input/output ports.

Pressure Transducer Inputs—Box 91

Controls the reading of the static and total pressure transducer voltages, and performs range checks to insure measured parameters are within acceptable limits.

Timer Inputs—Box 93

Upon initialization, at T=0, provides software controlled counter/time for high accuracy timing of time dependent events.

Decision Executive—Box 95

Checks that safe parachute deployment conditions are met and controls the application of power to the EFI firing circuits for the initiation of the EFI firing circuits and the initiation of the EFI firing sequence.

Figure 6A:
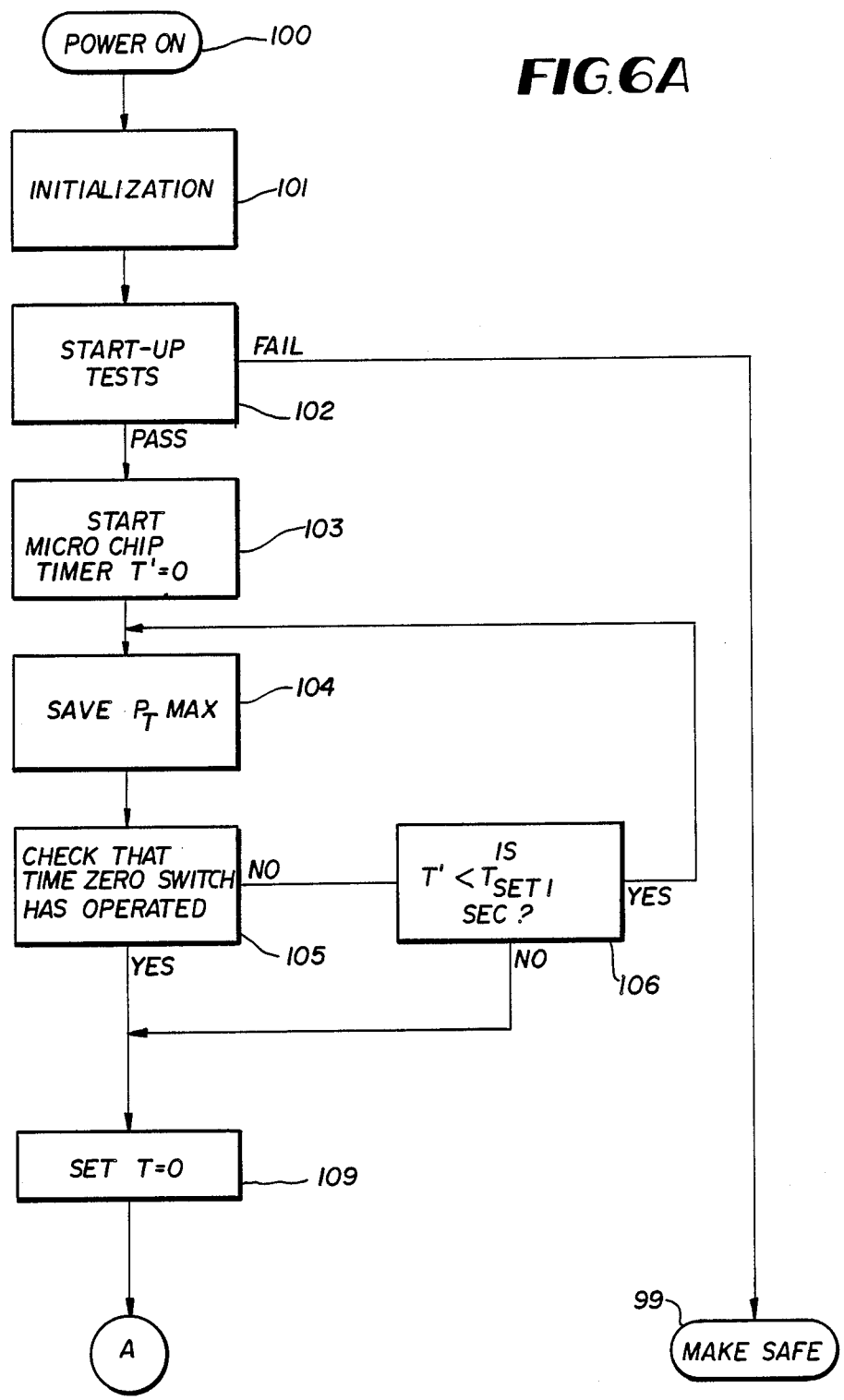
FIGS. 6A, 6B and 6C show a more detailed logic flow diagram of one representative embodiment of the microprocessor logic of this invention.
Figure 6B:
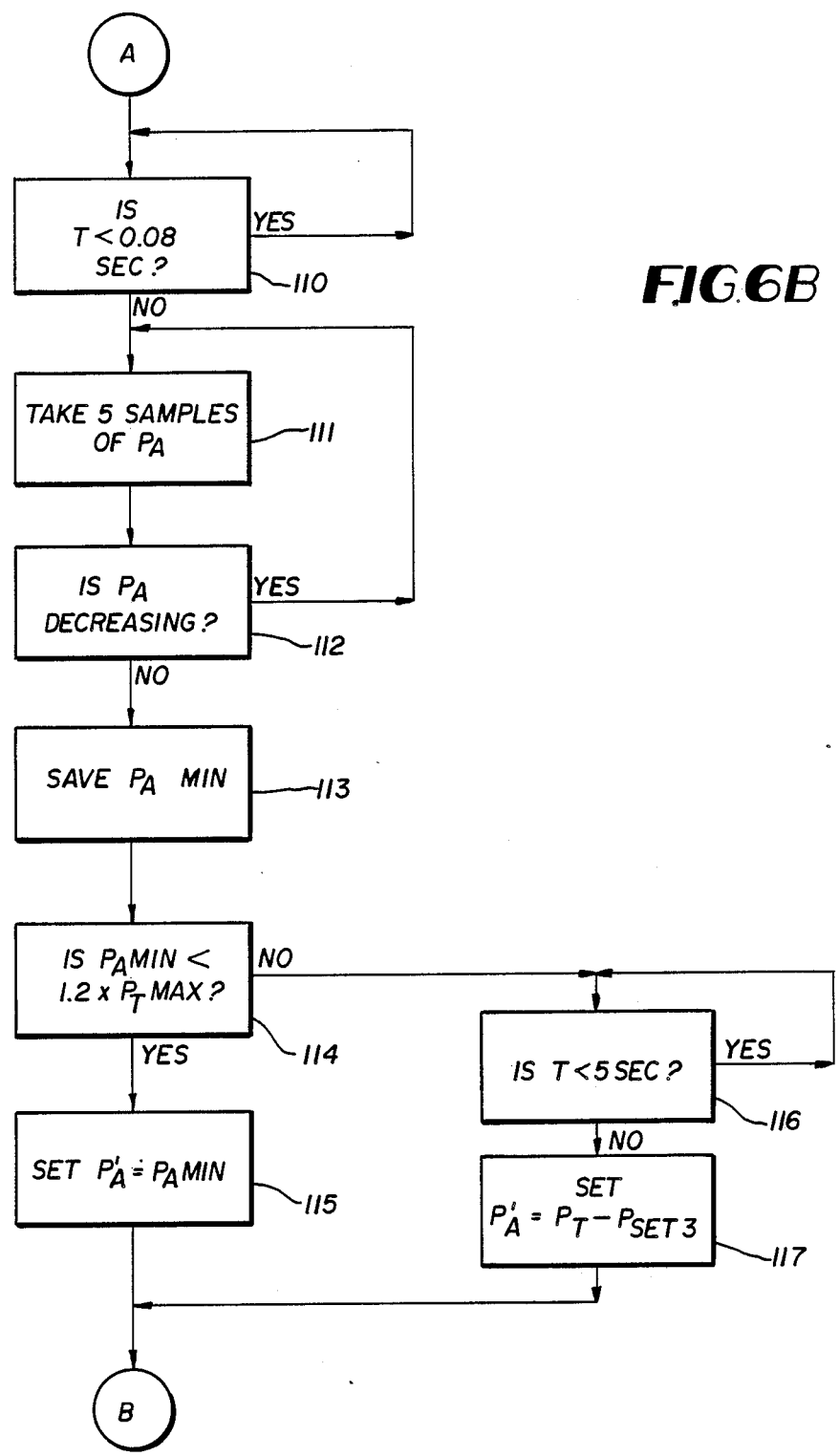
Figure 6C:
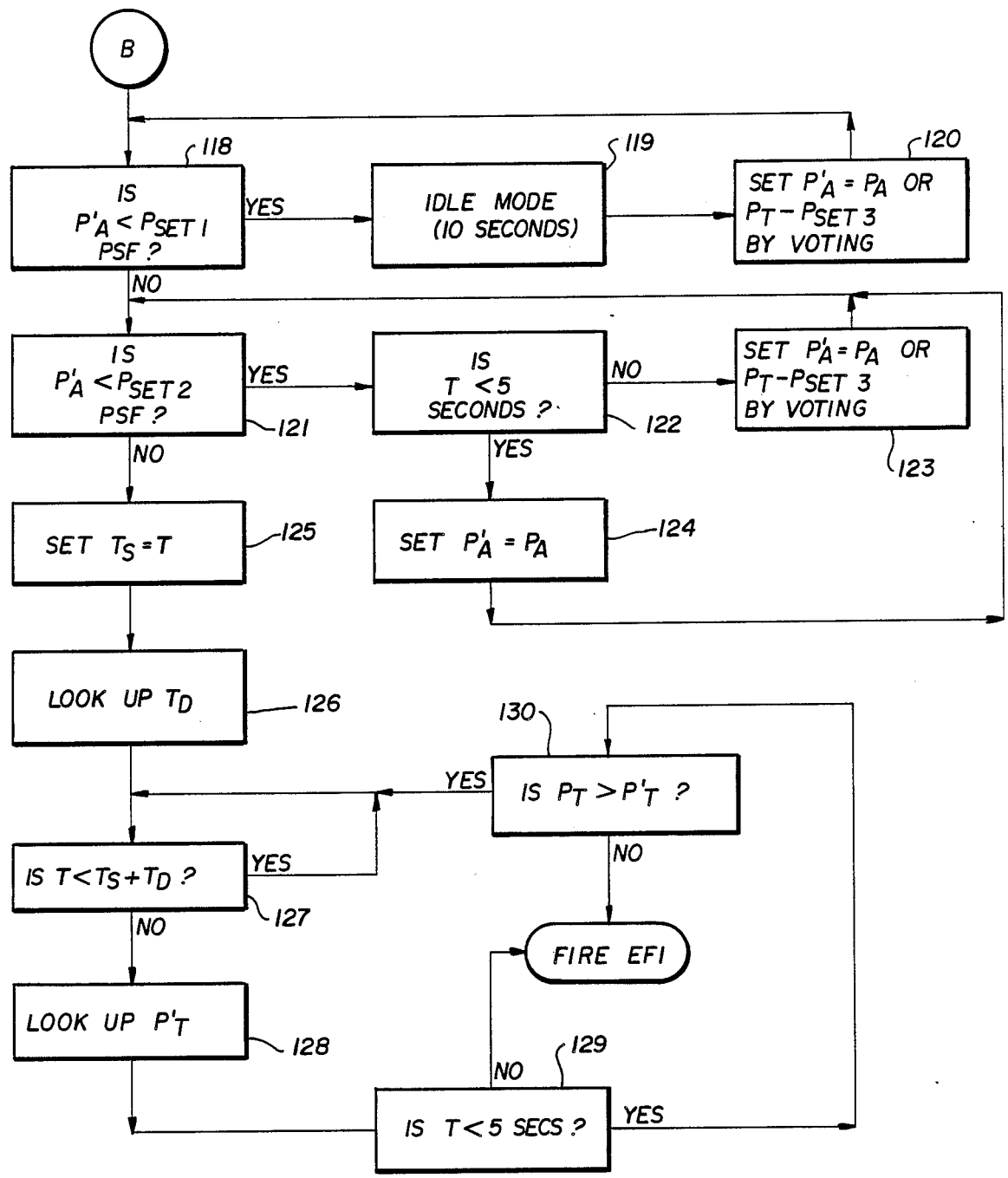

The microprocessor logic flow diagram of FIG. 6 embodies several different aspects of the invention. This flow diagram is not an entirely structured program and represents hardware/software requirements rather than software implementation only. This flow diagram will now be discussed in detail so that the advantages of the invention can be understood. The microprocessor controlled sequencer shall be referred to as the MCS, in the specification and claims hereof.

Each MCS of the two provided for the post ejection sequencing of the invention escape system realizes the power "on" condition when its thermal battery is activated at the time that the ejectee pulls the firing control to initiate the escape sequence. The microprocessor and its associated logic elements will be powered up within a few milliseconds of thermal battery activation, although they will be prevented from functioning at this time by the first of two reset circuits residing in ROM. This reset inhibits the microprocessor for the first 30 milliseconds after power up, to ensure that all components are powered on and ready to commence work together, thus precluding "run-away" at start up.

The "A" and "B" in the circle designations show the continuity of FIG. 6 from 6A to 6B to 6C.

FIG. 6 will now be discussed in detail.

1. Box 100 POWER ON, and box 101 Initialization

The sequence starts with initiation of ejection from the aircraft by the ejectee pulling handle 18 with a state-of-the-art-reset of the microprocessor.

The first function of the microprocessor once it has been released from reset is to initialize all status flags, ports, registers, etc. of CPU 60.

While this initialization is taking place the output power switches are held safe by the second reset that is active longer than the first reset.

2. Box 102, Start-Up Tests

The MCS will then enter into a series of self test safety checks. If the MCS passes all of these tests, it will proceed into a normal sequencing function. If, on the other hand, a potentially hazardous fault is detected, the MCS will proceed into a safe condition and the invention escape system operation will be dependent only upon the second MCS provided. Since the escape system is in the cockpit while these checks are being made all three pressure sensors have ambient pressure applied to them, and if any one of the three pressure sensors is in error the MCS will recognize the problem and will ignore that sensor and will introduce a time delay of a predetermined value of about 5 seconds before proceeding through the sequence.

3. Box 103, Start Microchip Timer

The microprocessor will then initiate a clock and timer to act as a time-out for time zero switch failure. Catapult ignition can have already occurred, but normally will occur a fraction of a second later.

4. Box 104, Save $P_T$MAX

The microprocessor begins sampling the left and right total pressure ports and saves the largest value of total pressure $P_{TMAX}$ read by either of the total pressure ports for a time interval extending out beyond time zero.

5. Boxes 105 and 106, Time Zero Loop

The microprocessor checks for time zero switch activation, which normally occurs at catapult separation. If time zero switch closing has occurred, the MCS proceeds with the sequence. If time zero switch closing has not occurred, the microprocessor loops around boxes 105 and 106 until either time zero switch closing occurs or the timer times-out. If, after a preset time delay TSET 1, time zero switch closing is not detected, the sequence will continue to box 109. Thus, if during a real ejection the time zero switch fails to operate, the MCS time-out of the preset time delay, TSET1 (e.g., 1 second or less) will provide a simulated time zero switch closing signal to enable the sequence to proceed.

6. Box 109, Set Time to Zero

Sequence timing will be from the time of time zero switch closing so that the value T is set to zero immediately after time zero Switch closing or after the preset time delay, TSET1, has elapsed, whichever occurs first.

7. Box 110, Time Zero Plus

The MCS will continue monitoring and saving $P_{TMAX}$. After 80 milliseconds beyond time zero, samples of ambient pressure will also be taken.

8. Box 111, Ambient Pressure (PA) Sampling

The best reading from at least 5 sample values of ambient pressure, $P_A$ taken over a period of up to 20 milliseconds in conjunction with the continuously saved $P_{TMAX}$ will be used to determine the correct post ejection sequence timing for parachute deployment. The philosophy of saving the maximum value of the greater value from the left and right pitot tubes assures that any blockage of one of the two pitot tubes will be overcome, and further, that blockages of both pitot tubes can be overcome unless both the blockages occur before the top of the ejection seat reaches the airstream and both continue thereafter for a period of over 100 milliseconds. This provides maximum integrity to the value sed for $P_T$. In the case of the $P_A$ sample (which is not redundant within one MCS) integrity is ensured by further checks.

9. Box 112, $P_A$ Decreasing

The first of the checks looks for a decreasing value of $P_A$. If $P_A$ is decreasing significantly, this is due to a supersonic or transonic ejection condition. Under these conditions the MCS loops around boxes 111 and 112 until no decreasing $P_A$ variation is sensed. Thus, this loop of boxes 111 and 112 assures that seat and ejectee velocity has decayed to Mach 1 or less before the sequence continues.

10. Box 113, Save $P_A$MIN

The minimum sensed value of $P_A$ will be saved.

11. Box 114, $P_A \leq 1.2 \times P_T$MAX

The second of the checks compares the value of $P_A$ to that of $P_T$. A range check during Start-Up Test has already verified that the sensor has not totally failed. This check provides confidence that the reading is reasonable. In the worst case $P_A$ should be no more than $P_{TMAX} \times 1.2$, due to Mach Number related pressure errors. Thus, a $P_A$ reading which is significantly higher than the true value can be rejected, without risk of rejecting valid readings which exhibit Mach related pressure error. In general, an erroneously low $P_A$ reading will cause a somewhat late firing of the EFI. However, since the other redundant MCS should fire the EFI at the correct time this condition will not be hazardous. If the MCS passes this check, it proceeds with the sequence to box 115.

12. Box 115, Set $P'_A = P_A$MIN

The value of ambient pressure for subsequent use will be set to the minimum sensed value. This assures that even if severe seat instability were to occur in an ejection the most conservative value for $P_A$ sensed during the ejection will be used for the first five seconds after time zero switch closing.

13. Box 116, 5 Second Time-Out

If the check in box 114 indicates a higher than true value for $P_A$, the MCS will use a long delay, e.g., 5 seconds, before proceeding with the sequence. This delay will provide ample time for the seat and occupant to slow down to near its terminal velocity, regardless of airspeed at egress. Also, it will allow the other redundant MCS to fire its EFI at the correct time for parachute deployment during that period.

14. Box 117, Assumed $P_A$ Value

After the 5 second delay of box 116 the MCS will assume a value for the ambient pressure $P_A$ which is a fixed value lower than the total pressure $P_T$. In any ejection at 20,000 feet or lower altitude during the 5 second delay of box 116 the seat and ejectee will slow to within a few percent of the terminal descent velocity for which the difference between $P_A$ and $P_T$ can be preset into the MCS with acceptable accuracy for the total weight range of ejectees. In ejections at altitudes above 20,000 feet a much longer time will be available to reach the terminal descent rate before the altitude is reached where parachute pack 11 opening will take place.

15. Boxes 118, 119 and 120, High Altitude Descent

The adopted value of $P'_A$ (from box 115 or box 117) is then used to determine whether the seat is above or below a preset pressure altitude corresponding to $P_{SET1}$. If it is at or below this preset pressure altitude $(P'_A \geq P_{SET1})$ the sequence will continue to box 121. If it is above this altitude the MCS will enter a hardware idle mode, box 119, for 10 seconds. In this mode a bare minimum of thermal battery energy is used by the CPU. At the 10 second time-out of this idle mode box 119 the MCS will compare both total pressure readings minus a fixed value to the static pressure reading and will set a new $P'_A$ value through majority voting. In "majority voting" as used herein, the two of the three valves which are closest to each other are averaged to provide the value to be used for the pressure in question. The MCS will again check whether the seat is above or below this preset altitude using the new $P'_A$ value, and will either repeat the loop or continue the sequence to box 121.

16. Boxes 121, 122, 123 and 124, High Altitude Descent

The adopted value of $P'_A$ (from box 115, box 117 or box 120) is then used to determine whether the seat is above or below a second preset pressure altitude corresponding to $P_{SET2}$. If it is at or below this second preset pressure altitude, the sequence will continue to box 125. If it is above this second preset pressure altitude, the sequence will loop through box 122 and box 123 or box 124 to set a new value of $P'_A$. Then the MCS will again check whether the seat is above or below this preset pressure altitude and will either repeat the loop or continue the sequence to box 125. Only a few milliseconds are required to traverse this loop, so that when the preset value $P_{SET2}$ is reached, no further delay will be introduced before the sequence continues.

17. Box 125, Set Start Time for Time Delay

The value for the time delay start time $T_S$ will then be set.

18. Box 126, Look-Up Table for Time Delay

The MCS will then use the values of $P'_A$ and $P_{TMAX}$ as vectors to a preset look-up table located in ROM. This table will provide a minimum acceptable time delay to parachute deployment ($T_D$) as a function of the altitude and airspeed which are represented by $P_A$ and $P_{TMAX}$. This preset table will provide values that correspond to: (1) the maximum safe parachute opening characteristics determined during parachute tests at various altitudes and (2) the airspeed decay versus elapsed time characteristics for the particular ejection seat determined in tests of the escape system.

19. Box 127, $T_D$ Time-Out

The MCS will then compare the value of $T_D$ plus $T_S$ to the elapsed time on the timer. When the time delay times out, the MCS will continue the sequence to box 128.

20. Box 128, Look-UP Table for Safe $P_T$ for Parachute Deployment

The MCS will use the latest $P'_A$ value as a vector to a second preset look-up table. This table will provide a maximum total pressure value ($P'_T$) safe for parachute deployment as a function of ambient pressure or altitude.

The value of ambient pressure closest to, but lower than, the measured value will be found and the corresponding value for total pressure at safe parachute deployment speed will be stored in memory. These values are based on previously established capabilities of the particular parachute being used in the ejection seat.

21. Box 129, 5 Second Time Check

If the elapsed time from time zero switch closing at catapult separation is equal to or greater than 5 seconds, the prevailing airspeed will be such that it is safe to open the parachute housing and deploy the parachute. Thus, the MCS will compare the value of T to 5 seconds. If T is less than 5 seconds the sequence will continue to box 130, but if not it will generate signal to fire the EFI.

22. Box 130, $P'_T$ Check-Out

The MCS will compare the value of $P'_T$ to the current larger total pressure value from the left and right hand pitot tubes. If the current larger total pressure value is greater than $P'_T$, the sequence will loop back through boxes 127, 128 and 129. If the current larger total pressure value is not greater than $P'_T$ the MCS will generate a signal to fire the EFI which will operate the parachute container opener mechanism and any other functions required by the particular escape system for parachute deployment.

The features and advantages provided by the invention microprocessor controlled sequencer and the above described flow diagram will now be pointed out in order that it might be seen how these both individually and collectively provide improvements over the prior art.

Start-Up Test Feature Allowing Pressure Sensor Checkout—Box 102

With the seat in the cockpit the three pressure sensors all will sense cockpit ambient pressure. Therefore, by majority voting a bad sensor can be identified and the sequencing modified to have a five second delay introduced. After five seconds the airspeed represented by the ejection seat terminal velocity is known. Thus, the total pressure readings can be decreased by a known value for evaluation of the current ambient pressure. It is also known that after five seconds it is safe to deploy the recovery parachute unless the seat/ejectee is above the desired preset maximum recovery altitude, usually set at 14,000 to 18,000 feet. With redundant sequencers no time penalty will accrue to the total system timing unless both sequencers have a malfunction; in which case only in those low altitude ejections where the added 5 second time delay can be dangerous is there any increased hazard to the ejectee. There is always a manual back up provided that will override both sequences.

Saving $P_{TMAX}$ Feature for Setting of Time Delay, TD—Box 104

Ejection seats with pitot tubes have been tested in through-the-canopy conditions numerous times. In those through-the-canopy tests where canopy debris did partially block a pitot tube two facts were always true: (1) prior to blockage the pitot tube was exposed to the airstream for a period of time during which the existing total pressure was accurately measured, and (2) the blockage did not continue for an appreciably long time. Saving $P_{TMAX}$ from the time the seat has started moving out of the cockpit for about 100 milliseconds will assure that even when both pitot tubes have been blocked by canopy debris in a through-the-canopy ejection the sequencer will not allow immediate parachute deployment that could otherwise occur. Only a microprocessor controlled sequencer with this feature can offer this protection.

Time Zero Switch Back-Up Feature—Box 109

If for any reason the pressure provided by the seat to the time zero switch is blocked or is vented to the atmosphere, the time zero switch will not operate to indicate to the MCS that the seat has reached the top of the guide rails. Unless a back-up is provided, all subsequent sequencing of events in that MCS will not take place because this switch did not operate. Of course, in this case the redundant MCS would normally deploy the recovery parachute at the proper time. However, with the time zero switch back-up feature included, even if both redundant MCS time zero switches were to fail, only a time penalty of a fraction of a second will be imposed.

80 Millisecond Time Delay After Time Zero Switch Closing—Box 110

The feature of delaying the sensing of the ambient pressure for 80 milliseconds after time zero switch closing assures that the bottom edge of the seat has moved away from the cockpit by about four feet before ambient pressure sensing is undertaken and the ambient pressure sensor is another foot or two higher on the seat. The local air flow over an aircraft fuselage in subsonic flight conditions is always at a higher than free stream airspeed and as a result is at a lower than free stream ambient pressure. The effects of this local air flow over the fuselage diminish rapidly as the point of measurement moves a few feet above the aircraft. Therefore, this feature assures that the ambient pressure measurements made in subsonic ejections will be sufficiently close to the free stream value that no undesired increase in the delay time to recovery parachute deployment is introduced. Without this feature an appreciably lower value of the ambient pressure measurement will be sensed in all high speed subsonic ejections which will indicate both a higher airspeed and a higher altitude than actually prevails and the time delay setting will be increased above the desired optimum value.

Sensing of Decreasing Ambient Pressure Feature—Box 112

The drag to mass ratio of an ejection seat assures that rapid deceleration of the ejected seat/ejectee will occur in all transonic and supersonic ejections. This rapid deceleration results in a rapid decrease of the free stream Mach number, which in turn will result in a rapid decrease in the ambient pressure existing behind the normal shock wave that will form forward of the seat/ejectee. Therefore, this feature will allow the MCS to delay the sensing of ambient pressure until it has decreased to its true free stream value. Without this feature, in all transonic and supersonic ejections the sensed ambient pressure value will be greater than the free stream value and a lower airspeed than actual and a lower altitude than actual will be computed by the microprocessor and catastrophic failure of the recovery parachute is possible.

Saving $P_{AMIN}$ Feature—Box 113

Wind tunnel studies on different ejection seats have been performed. An important observation coming out of these studies is that the ambient pressure measured at any point on the seat is affected by large yaw or pitch angles of the seat from the initial face forward seat attitude. This feature assures that the minimum observed ambient pressure value will be used as the ambient pressure vector in both look up tables. Thus, both the Time Delay value, $T_D$, and the total pressure value safe for parachute deployment, $P'_T$, will either be the desired value or will be a conservative slightly larger value than desired. Without this feature, a failure of the seat yaw stabilization system, whether drogue, aerodynamic surfaces, or controllable rockets, could result in the sensing of a higher than actual ambient pressure. Any higher than actual ambient pressure sensing will indicate to the MCS a lower airspeed and a lower altitude than actual and as a result the MCS can deploy the recovery parachute at an airspeed sufficiently high that catastrophic damage to the parachute would result.

Majority (two-out-three) Voting—Box 120

Five seconds or longer after exit from an aircraft cockpit and ejected seat/ejectee mass will have decelerated to an airpseed very close to its terminal descent rate due to earth gravity. It is known that this terminal velocity varies with the ejected weight, but even so, within a close approximation, the difference between the airstream total pressure measured by the left and right hand pitot tubes and the free stream ambient pressure is known and can be used to verify that all three sensors are reading correctly or that at least two of the three sensors are reading correctly. Each absolute pressure sensor has a built in vacuum in a sealed volume for its reference on one side of its sensing diaphragm. Thus, one failure mode is that this reference vacuum is lost due to leakage of air molecules into this sealed volume. In this case the pressure sensor will provide a singal to the MCS which indicates a lower pressure than is actual. This type of failure in the ambient pressure sensor would prevent firing of the EFI since the low pressure reading would always indicate a high altitude at which parachute deployment is not to occur. With redundant MCS units provided and assuming only one sensor failure the good MCS would deploy the parachute at the proper time. However, with this feature included, even if there was this type of failure in the ambient pressure sensor in each of the MCS units, parachute deployment would occur with only a time delay penalty in a low or intermediate altitude ejection but without any time delay penalty in those high altitude ejections where the descent time was 5 seconds or more.

Idle Mode for High Altitude Descent—Box 119

This is an important advantage of the invention.

The mass to drag ratio of one ejection seat design with a stabilization drogue will result in a rate of descent under earth gravity that results in an equivalent airspeed (standard atmospheric conditions) of 160 feet per second or less. This corresponds to a true rate of descent at an altitude of 20,000 feet of 220 feet per second or less. At higher altitudes the true rate of descent further increases so that descent times for free fall from a 70,000 feet altitude ejection down to 20,000 feet will require from 130 seconds for said seat design to as much as 200 seconds for other seat designs. The total energy drained from a thermal battery over its maximum life, among other factors, determines its size and weight.

With this idle mode feature in the MCS, during descent from 70,000 to 20,000 feet for example, the idle mode current drain from the battery would be in effect for over 99 percent of the descent time and the total energy drain from the battery is essentially set by the idle mode current drain. Since the idle mode current can be less than one half the normal mode current, the size of the thermal battery can be reduced appreciably. This permits direct mounting of the thermal battery to the MCS even under the tight volume constraints that exist in an ejection seat.

Using the Second Preset Ambient Pressure Value for Control of System Sequencing in High Altitude Ejections—Box 121

During the 10 second delay of the high altitude descent idle mode the seat/ejectee will fall as much as 2,000 feet near that altitude which is the desired maximum for parachute deployment. Thus, there is a random variation of over 2,000 feet in the altitude at which the last 10 second idle mode is initiated and as a result there is a similar variation in the altitude at which this last 10 second idle mode is terminated. This feature of the invention eliminates this large random variation in the altitude at which parachute deployment takes place in any high altitude ejection and replaces it with a very small random variation. This very small random variation is a result of the terminal descent velocity continuing through the very small time delay (of a few milliseconds) required by the MCS to transverse the loop around boxes 121, 122, and 123 or 124. Further, this random variation is much smaller than the uncertainty in pressure altitude that results from the inaccuracy inherent in the pressure transducers.

Setting time delay, $T_D$, by Ambient Pressure and Total Pressure Vectors—Box 114

It is well known by those skilled in ejection seat design that with increasing altitude the ratio of true airspeed to equivalent airspeed also increases. As a result, the time required to decelerate an ejection seat from a given high value of equivalent airspeed to a given low value of equivalent airspeed also increases with increasing altitude. Also, it is well known by those skilled in parachute design that with increasing altitude the maximum equivalent airspeed at which it is safe to deploy a parachute canopy with a preset suspended weight decreases. With this feature included in the MCS a near optimum time delay throughout the total altitude/airspeed envelope of the ejection seat escape system can be achieved.

Setting Parachute Deployment Total Pressure, $P'_T$, by Ambient Pressure Vector—Boxes 120 and 123

Not only does the maximum equivalent airspeed at which it is safe to deploy the recovery parachute decrease with increasing altitude, but also the requirement for rapid parachute operation decreases dramatically as altitude increases above some level such as 10,000 feet. This is true because the percentage of the earth's surface that is at or above a given altitude and over which a specific aircraft is flying becomes smaller and smaller as the altitude value increases. With this feature in the MCS it is possible to define a parachute deployment airspeed throughout the altitude envelope of the escape system that is optimized on considerations other than just the maximum safe parachute deployment airspeed. It is possible, for example, to give all ejectees much lower parachute opening shock forces in ejections above some preset altitude level, such as 10,000 feet.

Combining Delay Time, $T_D$, and the Total Pressure, $P'_T$, to Set Parachute Deployment—Boxes 126 to 130 inclusive The MCS of this invention includes as one of its features the combination of the time delay, $T_D$, set by the two vectors $P'_A$ and $P_T$MAX and the parachute deployment total pressure, $P'_T$, set by the vector $P'_A$. In any subsonic ejection in which the sensed ambient pressure is not decreasing and is equal to or greater than the second preset pressure value, $P_{SET2}$, the time delay, $T_D$, is set early in the escape trajectory at about 100 milliseconds after separation of the ejected seat from the aircraft. At this time the seat will be in a near face forward attitude even if complete failure of any or all of the seat yaw and pitch stabilization devices has occurred. In such an ejection the parachute deployment total pressure, $P'_T$, is only set after the time delay, $T_D$, has elapsed which can therefore occur late in the escape trajectory. At this later time, if complete failure of any or all of the seat yaw and pitch stabilization devices had occurred, the seat could be in such an orientation to the airstream that a very low value of total pressure was being read by the pitot tubes. With this feature incorporated in the MCS the time delay, $T_D$, prevents a catastrophic premature deployment of the recovery parachute even for such failure conditions.

A second important aspect of this feature is the use of the parachute deployment total pressure, $P'_T$, subsequent to the termination of the time delay, $T_D$, to prevent parachute deployment if the airspeed is larger than desired for recovery. In a high speed (600 KEAS) ejection on a hot day, with a heavy ejectee, and in a near vertical dive attitude at the end of the time delay, $T_D$, the airspeed would be about 50 knots greater than would be true if the ejection conditions had been on an average day (standard atmospheric conditions), with an average weight ejectee, and in near horizontal flight. With this feature incorporated, however, parachute deployment will not occur until the desired airspeed has been achieved by any weight ejectee, on any hot or cold day, and/or flying in any dive or climbing flight condition.

In addition, with this feature incorporated any failure or malfunction of the deceleration drogue that results in a slower deceleration rate of the seat/ejectee mass to the desired airspeed for parachute deployment will not result in a high speed parachute deployment.

While the invention has been described in detail above, it is to be understood that this detailed description is by way of example only, and the protection granted is to be limited only within the spirit of the invention and the scope of the following claims.

I claim:

1. In an aircraft ejection seat, the combination comprising:

a parachute and means carried by the seat to deploy the parachute;

left and right pitot tubes carried by the seat;

means carried by the seat to sense ejection of the seat from the aircraft;

a pair of redundant housings carried by the seat;

each one of said pair of housings including therein a microprocessor controlled sequencer (MCS);

each said MCS including means to activate said means to deploy said parachute, pressure sensor means to sense the pressures detected by said left and right pitot tubes and to sense the ambient pressure local to said seat and to produce signals proportional to said three sensed pressures of said pitot tubes and ambient pressures, data storage means, battery means, switch means, and control means;

each said data storage means including ROM memory means in which data corresponding to preset control functions and system performance have been previously stored, and said data storage means further comprising RAM memory for active use during an escape sequence with the data in said ROM memory together with data produced by said pressure sensor means corresponding to said left and right pitot tube and to the local ambient pressures to continuously optimize operation of an escape sequence as it occurs;

each of said MCS control means being operative independently of its companion redundant MCS control means to cause said optimum operation and parachute deployment after seat/ejectee ejection from the aircraft when said MCS determines one or both of:

A. the seat/ejectee mass is moving at a speed equal to or less than a predetermined speed that is safe for parachute deployment at the prevailing altitude and that the altitude of the seat/ejectee mass above sea level is below a predetermined safe altitude; and B. a time delay has elapsed, which time delay was set by the MCS to the minimum value for safe parachute deployment for a normal ejection based upon the pressure, altitude and airspeed measured by the pressure sensors in the MCS;

each said MCS including means to make said determinations based upon said three pressure signals, the data stored in said data storage means, the elapsed time of operation of said switch means, and utilizing the electrical power in said battery means; and each said switch means being operated at the time of ejection of said seat from the aircraft.

2. The combination of claim 1, said MCS including means that during start up of said MCS recognizes a failure of any one of said three pressure sensors to measure the ambient cockpit pressure and in the event of such failure to thereafter ignore that pressure sensor, and, optionally as determined by said MCS, to go into a safe condition for a predetermined period of time after which, said MCS includes means to decrease any valid total pressure reading by a predetermined value to establish by majority voting the best estimate of pressure altitude.

3. The combination of claim 2, wherein subsequent to said predetermined time delay or subsequent to five or more seconds beyond said time of operation of said switch means, said MCS includes means to decrease said total pressure sensor measurements of said left and right pitot tubes by a predetermined value corresponding to the terminal descent velocity of said ejection seat and then, said MCS includes means to compare these new pressure values to said ambient pressure sensor measurement value and, said MCS includes means to select the two of three said pressure values that are in closest agreement and said MCS includes means to average said two pressure values and to use said average pressure value in the place of said ambient pressure measurement for subsequent sequencing.

4. The combination of claim 1, said MCS including means that subsequent to start up of said MCS continuously compares the larger total pressure measurement by said pressure sensors associated with said left and right pitot tubes to the largest previous total pressure measurement, and said MCS includes means to continually keep in memory the maximum total pressure measurement until a predetermined time delay has elapsed subsequent to ejection of the seat from the aircraft, and said MCS includes means to determine a minimum safe time delay to parachute deployment based upon this maximum total pressure value, but said MCS also includes means to thereafter select the larger of the total pressure measurements most recently made on the said left and right pitot tubes, for subsequent use in the MCS sequence.

5. The combination of claim 1, said MCS includes means to subsequent to start up of said MCS, set the sequence time to zero upon operation of said switch means or upon elapse of a predetermined time delay, whichever occurs first, and said MCS includes means to perform all subsequent sequencing using the said time zero setting.

6. The combination of claim 5, wherein subsequent to start up of the MCS and upon setting of the sequence time to zero at the time of operation of said switch means or at time said predetermined time delay has elapsed, said MCS includes means to continuously monitor the total pressure measurements by the said pressure sensors of the said left and right pitot tubes for a predetermined time delay, and said MCS includes means to continue the programmed sequencing only after said predetermined time delay has elapsed.

7. The combination of claim 6, said MCS includes means to subsequent to the elapse of said time delay, continuously compare the current measurement of ambient pressure by said pressure sensor to the last previous measurement of said ambient pressure and, if the said current ambient pressure measurement is less than the said last previous ambient pressure measurement, said MCS includes means to not continue the programmed sequencing but to continue comparing the next current ambient pressure measurement to the last previous ambient pressure measurement until, said current ambient pressure measurement is equal to or greater than said last previously ambient pressure measurement and at that time, said MCS includes means to store the minimum ambient pressure measurement in its memory and to continue the programmed sequencing.

8. The combination of claim 5, wherein after elapse of a predetermined time delay from said setting of sequence time to zero or after elapse of said predetermined time period until said MCS comparison of said ambient pressure measurement value with said predetermined ambient pressure value finds said ambient pressure measurement value is equal to or greater than said predetermined ambient pressure value and then said MCS continues its normal sequencing, said MCS includes means to compare said ambient pressure measurement value to a predetermined ambient pressure value, said MCS includes means to go into a preprogrammed idle mode if said ambient pressure measurement value is less than said predetermined ambient pressure value and said MCS includes means to continue in said preprogrammed idle mode for a predetermined time period and then includes means to exit from said preprogrammed idle mode and includes means to repeat said comparison of said ambient pressure measurement value with said predetermined ambient pressure value and to reenter said preprogrammed idle mode for a predetermined time delay, or subsequent to achieving a predetermined ambient pressure measurement will continue its normal sequencing.

9. The combination of claim 8, wherein after said MCS has found that said ambient pressure measurement value is equal to or greater than said predetermined ambient pressure value then said MCS includes means to compare said ambient pressure measurement value to a second predetermined ambient pressure value that is larger than said first predetermined ambient pressure value said MCS includes means to continue to compare said ambient pressure measurement value to said second predetermined ambient pressure value until said MCS finds that said ambient pressure measurement value is equal to or greater than said second predetermined ambient pressure value and then said MCS includes means to continue its normal sequencing.

10. The combination of claim 9, wherein after said MCS has found that said ambient pressure measurement value is equal to or greater than said second predetermined ambient pressure value then said MCS includes means to use the said ambient pressure measurement value as first vector and shall use a larger total pressure measurement value as second vector to a two dimensional table permanently stored in said data storage means of said MCS said MCS includes means to store in said data storage means the time delay value from said two dimensional table as located by said first vector and said second vector said MCS includes means to wait until said stored time delay has elapsed and then said MCS includes means to continue its normal sequencing.

11. The combination of claim 8, wherein after said MCS has found that said ambient pressure measurement value is equal to or greater than said second predetermined ambient pressure value said MCS includes means to use the said ambient pressure measurement value as a vector to a one dimensional table permanently stored in said data storage means of said MCS said MCS includes means to store in said data storage means the total pressure value from said one dimensional table as located by said vector said MCS includes means to wait until said larger total pressure measurement value is equal to or less than a stored total pressure value, and said MCS includes means to continue its normal sequencing.

12. A method of operating an aircraft ejection comprising the steps of:

providing a parachute and means carried by the seat to deploy the parachute;

providing left and right pitot tubes on the seat;

providing means to sense ejection of the seat from the aircraft on the seat;

providing a pair of redundant housings on the seat, a microprocessor controlled sequencer (MCS) in each one of said pair of housing;

providing each said MCS with means to activate said means to deploy said parachute, pressure sensor means to sense the pressures detected by said left and right pitot tubes and to sense the ambient pressure local to said seat, data storage means, battery means, switch means, and control means;

providing ROM and RAM memory means in each of said data storage means;

storing predetermined data corresponding to preset control functions and system performance in said data storage means ROM memory;

using said RAM memory means during an escape sequence together with said data stored in said ROM memory means and data produced by said pressure sensor means corresponding to said left and right pitot tube and to the local ambient pressure to continuously optimize operation of an escape sequence as it occurs;

producing signals proportional to said three sensed pressures of said pitot tubes and ambient pressures;

operating at least one of said MCS control means independently of its companion redundant MCS control means to cause said optimum operation and parachute deployment after seat/ejectee ejection from the aircraft when said MCS performs steps to determine that one or both of the following conditions exist:

A. that the seat/ejectee mass is moving at a speed equal to or less than a predetermined speed that is safe for parachute deployment at the prevailing altitude and that the altitude of the seat/ejectee mass above sea level is below a predetermined safe altitude; and B. that a time delay has elapsed, which time delay was set by the MCS to the minimum value for safe parachute deployment for a normal ejection based upon the pressure, altitude and airspeed measured by the pressure sensors in the MCS;

using said MCS to make said determinations based upon said three pressure signals, data stored in said data storage means, the elapsed operation time of said switch means, and utilizing the electrical power in said battery means; and operating each said switch means at the time of ejection of said seat from said aircraft.

13. The method of claim 12, and the additional steps wherein during start up of said MCS said MCS recognizes a failure of any one of the said three pressure sensors to measure the ambient cockpit pressure and in the event of such failure thereafter ignores that pressure sensor, and, as determined by said MCS, causes said MCS to proceed into a safe condition for a predetermined period of time after which, said MCS decreases any valid total pressure reading by a predetermined value to establish by majority voting the best estimate of pressure altitude.

14. The method of claim 13, and the additional steps wherein subsequent to said predetermined time delay or subsequent to five or more seconds beyond said time of operation of said switch means, said MCS decreases said total pressure sensor measurements of said left and right pitot tubes by a predetermined value corresponding to the terminal descent velocity of said ejection seat and then, said MCS compares these new pressure values to said ambient pressure sensor measurement value and said MCS selects the two of three said pressure values that are in closest agreement and, said MCS averages said two pressure values and uses said average pressure value in the place of said ambient pressure measurement for subsequent sequencing.

15. The method of claim 12, and the additional steps wherein subsequent to start up of said MCS continuously compares the larger total pressure measurement made by said pressure sensors associated with said left and right pitot tubes to the largest previous total pressure measurement, and said MCS continually keeps in memory the maximum total pressure measurement until a predetermined time delay has elapsed subsequent to ejection of the seat from the aircraft, and said MCS determines a minimum safe time delay to parachute deployment based upon this maximum total pressure value, but said MCS thereafter selects the larger of the total pressure measurements most recently made on the said left and right pitot tubes, for subsequent use in the MCS sequence.

16. The method of claim 12, and the additional steps wherein subsequent to the start up of the MCS and upon setting of the sequence time to zero at the time of operation of said switch means or at the time said predetermined time delay has elapsed, said MCS continuously monitors the total pressure measurements by the said pressure sensors of the said left and right pitot tubes for a predetermined time delay, and said MCS continues the programmed sequencing only after said predetermined time delay has elapsed.

17. The method of claim 16, and the additional steps wherein subsequent to the elapse of said time delay said MCS continuously compares the current measurement of ambient pressure by said pressure sensor to the last previous measurement of said ambient pressure, and if the said current ambient pressure measurement is less than the said last previous ambient pressure measurement said MCS shall not continue the programmed sequencing, and said MCS shall continue comparing the next current ambient pressure measurement to the last previous ambient pressure measurement until, said current ambient pressure measurement is equal to or greater than said last previously ambient pressure measurement and at that time, said MCS stores the minimum ambient pressure measurement in its memory and continues the programmed sequencing.

18. The method of claim 12, and the additional steps wherein subsequent to start up of said MCS said MCS sets the sequence time to zero upon operation of said switch means or upon elapse of a predetermined time delay, whichever occurs first, and said MCS performs all subsequent sequencing using the said time zero setting.

19. The method of claim 18, and the additional steps wherein after elapse of a predetermined time delay from said setting of sequence time to zero, or after elapse of said predetermined time period until said MCS comparison of said ambient pressure measurement value with said predetermined ambient pressure value finds said ambient pressure measurement value is equal to or greater than said predetermined ambient pressure value and then said MCS continues its normal sequencing, said MCS compares said ambient pressure measurement value to a predetermined ambient pressure value, said MCS goes into a preprogrammed idle mode if said ambient pressure measurement value is less than said predetermined ambient pressure value and said MCS shall continue in said preprogrammed idle mode for a predetermined time period and then said MCS exits from said preprogrammed idle mode and repeats said comparison of said ambient pressure measurement value with said predetermined ambient pressure value and reenters said preprogrammed idle mode for a predetermined time delay, or subsequent to achieving a predetermined ambient pressure measurement, will continue its normal sequencing.

20. The method of claim 19, and the additional steps wherein after said MCS has found that said ambient pressure measurement value is greater than or is equal to said predetermined ambient pressure value then said MCS compares said ambient pressure measurement value to a second predetermined ambient pressure value that is larger than said first predetermined ambient pressure value, said MCS continues to compare said ambient pressure measurement value to said second predetermined ambient pressure value until said MCS finds that said ambient pressure measurement value is equal to or greater than said second predetermined ambient pressure value and then said MCS continues its normal sequencing.

21. The combination of claim 20, and the additional steps wherein after said MCS has found that said ambient pressure measurement value is equal to or greater than said second predetermined ambient pressure value said MCS uses said ambient pressure measurement value as first vector and uses the said larger total pressure measurement value as second vector to a two dimensional table permanently stored in said data storage means of said MCS said MCS stores in said data storage means the time delay value from said two dimensional table as located by said first vector and said second vector said MCS waits until said stored time delay has elapsed and then said MCS continues its normal sequencing.

22. The method of claim 19, and the additional steps wherein after said MCS has found that said ambient pressure measurement value is equal to or greater than said second predetermined ambient pressure value said MCS uses the said ambient pressure measurement value as a vector to a one dimensional table permanently stored in said data storage means of said MCS said MCS stores in said data storage means the total pressure value from said one dimensional table as located by said vector, said MCS waits until said larger total pressure measurement value is equal to or less than a stored total pressure value, and said MCS continues its normal sequencing.

* * * * *